United States Patent [19]
Roth

[11] Patent Number: 5,295,646
[45] Date of Patent: Mar. 22, 1994

[54] LONGITUDINAL U-CLIP

[76] Inventor: Steven A. Roth, 2891 Danville Blvd., Alamo, Calif. 94507

[21] Appl. No.: 42,221

[22] Filed: Apr. 2, 1993

[51] Int. Cl.⁵ .............................................. E21F 17/02
[52] U.S. Cl. ........................................ 248/58; 248/62
[58] Field of Search ................ 248/58, 59, 62, 73, 248/327, 74.1, 68.1; 52/27

[56] References Cited

U.S. PATENT DOCUMENTS

| | | | |
|---|---|---|---|
| 2,705,158 | 3/1955 | Risley | 248/62 |
| 2,714,497 | 8/1955 | Denis | 248/62 |
| 3,570,794 | 3/1971 | Kirshner | 248/327 |
| 4,078,752 | 3/1978 | Kindorf | 248/59 X |
| 4,637,175 | 1/1987 | Froening | 52/27 |
| 4,770,378 | 9/1988 | Onishi | 248/73 |
| 5,004,193 | 4/1991 | Kirshner | 248/59 |
| 5,110,074 | 5/1992 | Deguchi | 248/340 |

FOREIGN PATENT DOCUMENTS 525189  5/1956  Canada .................................. 248/62

Primary Examiner—J. Franklin Foss
Attorney, Agent, or Firm—Glen R. Grunewald

[57] ABSTRACT

A brace to prevent a pipe from moving longitudinally within a hanger in the event of swaying motion of a structure, the device including a pipe hanger braced against swaying in both the transverse and longitudinal direction of the pipe and a brace that is firmly fixed to the pipe to prevent relative motion between the brace and the pipe in the longitudinal direction of the pipe, the brace being further firmly fixed to the hanger to prevent relative motion between the brace and the hanger.

3 Claims, 2 Drawing Sheets

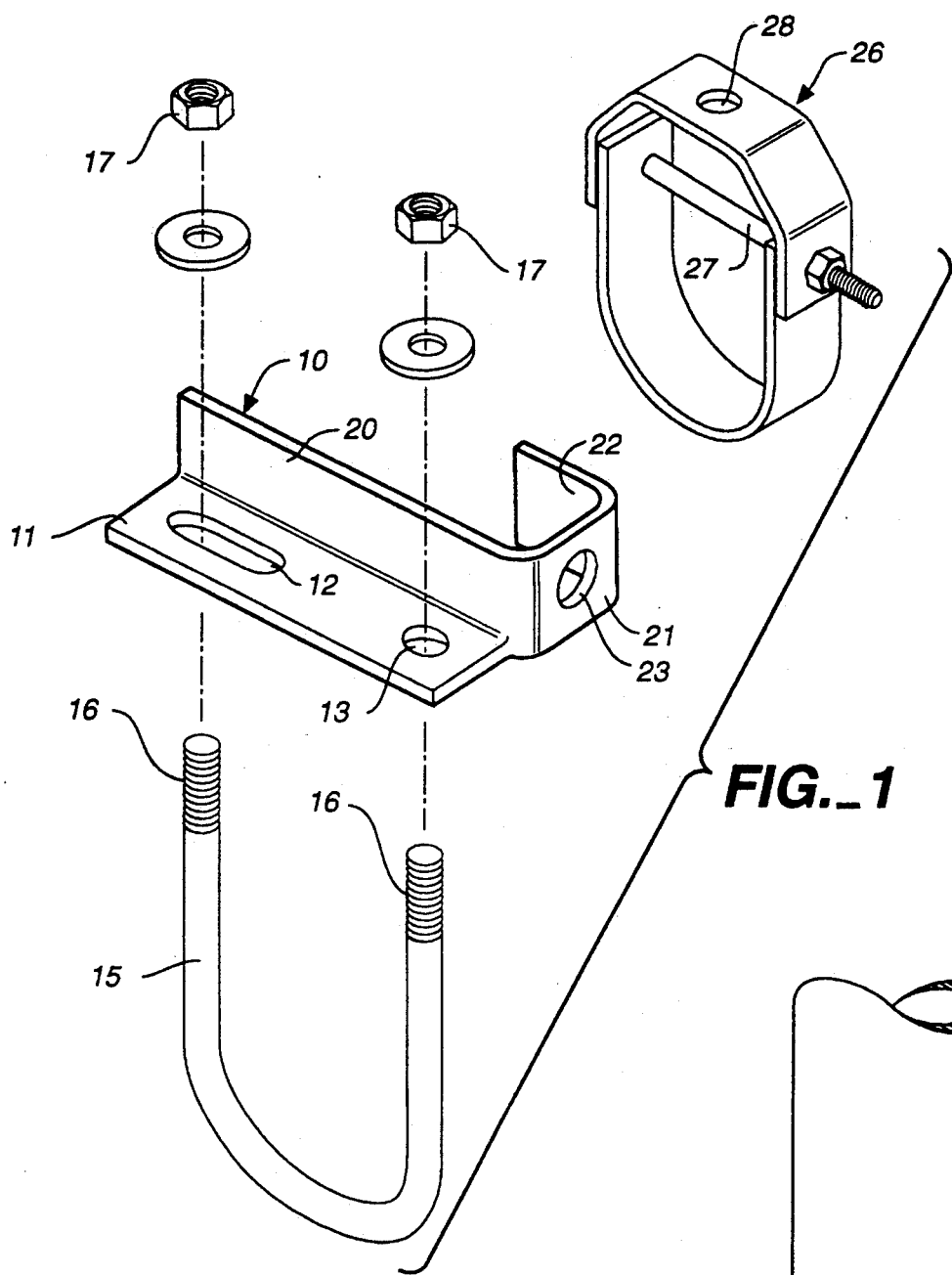
FIG._1
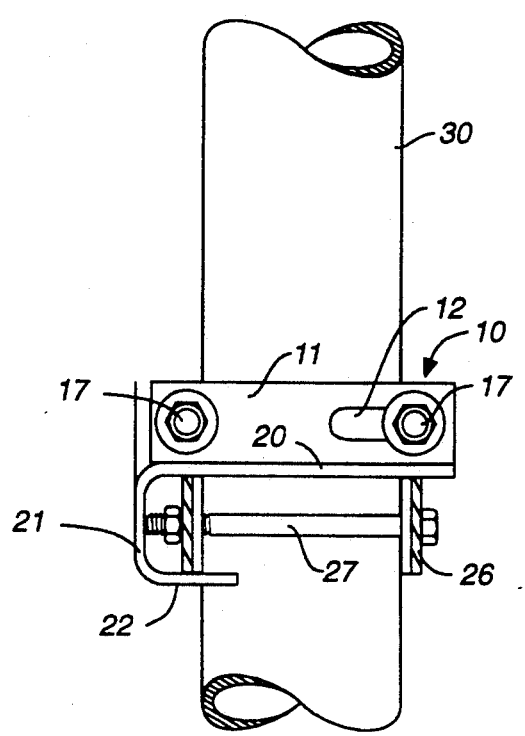
FIG._4

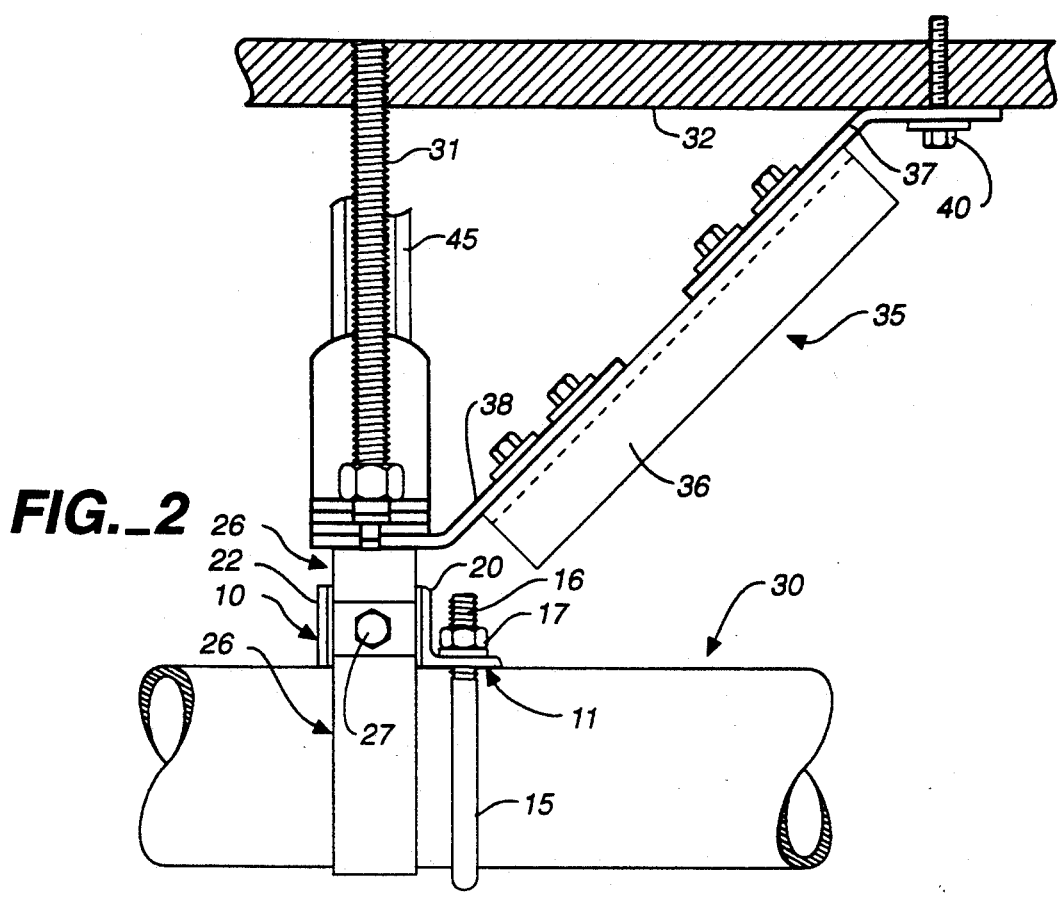
FIG._2
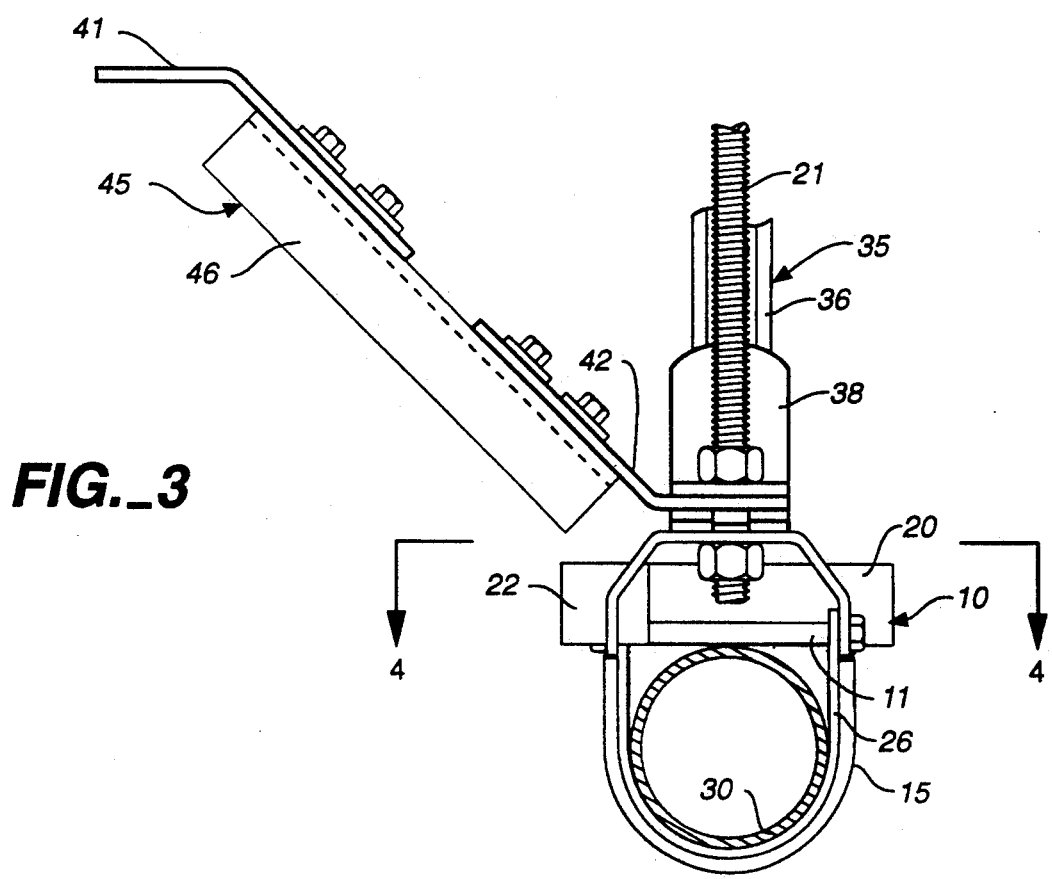
FIG._3

LONGITUDINAL U-CLIP

FIELD OF THE INVENTION

This invention is in the field of support systems to suspend electrical conduit or mechanical piping or the like from overhead structures, the support systems being protected from destruction by seismic displacement or similar forces.

BACKGROUND OF THE INVENTION

In many structures electrical conduit or piping or the like is suspended from ceilings or beams. The conduit or piping or similar loads, hereinafter called the load, is held by supports which are suspended from the ceiling or from beams in the structure by threaded rods. The supports come in different forms. A trapeze support holds a number of loads side-by-side while a J support holds a single load. The supports are generally spaced about 8 to 12 feet apart depending on the weight, strength and other characteristics of the load and the architecture of the structure.

Earthquakes, wind and other factors sometimes cause buildings to sway and when buildings sway support systems and their supported loads oscillate both in the direction longitudinal to the axis of the load and in the direction transverse to that axis. To prevent oscillations hangers and supports have been braced against such movement by braces that are connected to the supports, extend from them at an angle and are connected to the overhead structure. Such bracing systems may prevent the hangers and supports from oscillating in any direction with respect to the supporting structure but they do not prevent the load itself from moving with respect to the structure when the structure is subjected to a swaying motion. Thus, a supported pipe, for example, cannot move transverse to its long axis when the supporting structure sways but it can move longitudinally with respect to its support when the supporting structure sways in that direction.

A variety of devices have been used to prevent piping from sliding longitudinally with respect to a hanger but those devices are usually specifically designed for the characteristics of the load, a different one for each pipe size for example, and are also specifically designed for the characteristics of the hanger, for example a J hanger brace cannot be used with a trapeze hanger or a clevis hanger.

SUMMARY OF THE INVENTION

This invention is a device to prevent longitudinal sliding of a load with respect to its braced support hanger. The device of this invention is independently and firmly connected to the load and also independently and firmly connected to the braced support for that load. The connection between the device of this invention and the load is such that the device may be employed with loads having different diameters and other characteristics so that a contractor need not keep an inventory of many different sized devices to prevent longitudinal sliding of different sized and shaped loads within their braced supports.

The device of this invention includes a brace that has a load-engaging element that is releasably connectable to the elongated load. In its most basic form the load-engaging element is a U-bolt mounted through a plate-like member so that the U-bolt may surround the elongated load and be tightened so that it holds the elongated load firmly enough to prevent relative motion between the brace and the elongated load. The brace further is provided with an interlocking element for interlocking with the support so that the brace and the support are prevented from having relative motion between them.

In a preferred embodiment of the invention the support is also provided with means to prevent either longitudinal or lateral motion with respect to the structure to which it is connected. Thus, a typical support will consist of a threaded rod connected to a ceiling or beam of a structure and having a load hanger connected to its bottom. Such a support will be able to swing in the event of an earthquake or the like. In the preferred embodiment the support is provided with diagonal bracing to the ceiling in both the longitudinal and transverse directions of the elongated load so that the support cannot swing relative to the structure. In other words, if the structure sways the support sways with it.

In another preferred embodiment the device of this invention comprises two, plate-like elements having their planar surfaces at 90° to one another. One plate-like element is provided with means to hold the load-engaging element and the other plate-like element is provided with means to hold the interlocking element. The plate-like elements connected to each other and having their planar surfaces at 90° to one another provides a very rigid configuration that resists bending caused by stress at any angle. The plate-like element that is provided with interlocking means may have interlocking means that is formed of a U-shaped bend that will embrace the support element when the device is in its installed position.

BRIEF DESCRIPTION OF THE DRAWINGS

FIG. 1 is an exploded perspective view of a device embodying this invention shown in a displaced position relative to a clevis hanger.

FIG. 2 is an elevation view of the device of FIG. 1 shown support an elongated load.

FIG. 3 is a view of the device of FIG. 2 rotated 90°.

FIG. 4 is a top cross sectional view of FIG. 3 taken along the line 4—4.

BEST MODE FOR CARRYING OUT THE INVENTION

The exploded view of FIG. 1 shows the elements of the device of this invention as they relate to each other but without an elongated load that is being supported. In this description the elongated load will be a pipe.

The device is generally designated 10. It includes a flange 11 which in this embodiment is provided with two holes. Hole 12 is an elongated hole and hole 13 is a round hole and both are dimensioned to receive the ends of U-bolt 15. The use of elongated hole 12 permits easy insertion of the two legs of U-bolt 15 because they not both have to fit into a circular hole that is only slightly larger in diameter than the legs of the U-bolt and it further permits the use of U-bolts of different sizes to accommodate pipes of different diameters. The U-bolt 15 has threaded ends 16 which are placed through holes 12 and 13 surrounding a pipe and then fastened to the device 10 with nuts 17 and appropriate washers if they are required. Tightening nuts 17 on threaded ends 16 permit the U-bolt to clamp a pipe with whatever degree of tightness that is required to prevent relative motion between the device 10 and a pipe, as will be shown in respect to the other drawings.

The device of this invention also includes a flange 20, the flat surfaces of which are perpendicular to the flat surfaces of the flange 11. The flange 20, in this embodiment, includes a perpendicular extension 21 the length of which is roughly the width of a hanger, shown here as a clevis hanger 26. Another perpendicular extension 22 is in a plane perpendicular to the plane of extension 21 and parallel to the plane of flange 20. Extension 21 includes a hole 23 which is useful for access to the locking nut of the clevis hanger as will be shown with respect to FIG. 4.

The clevis hanger 26 is made in accordance with the known configurations for such hangers and it includes a hole 28 for connecting it to a threaded hanger rod and a nut-and-bolt arrangement designated 27 which is used to separate the top and bottom portions of the clevis hanger so that a pipe can be installed in the lower, U-shaped portion of the hanger and subsequently attached to the upper portion.

FIG. 2 illustrates the device of this invention supporting a pipe 30 and connected to the ceiling 32 of a structure. The pipe 30 is supported in the U-shaped bottom portion of clevis hanger 26. The pipe 30 is embraced with a U-bolt 15 which is tightened to hold pipe 30 firmly by tightening nuts 17. Thus, the flange 11 bears tightly against pipe 30 so that there can be no relative motion between pipe 30 and flange 11. The flange 20 is positioned closely in proximity to, or even in contact with, the clevis hanger 26 and in FIG. 2 the perpendicular extension 21 is not visible, but perpendicular extension 22 is shown in close proximity to the other side of clevis hanger 26 so that the general U-shape of the extensions 21 and 22 embrace the clevis hanger 26. This arrangement can best be seen in FIG. 4 which also shows that the nut holding the two portions of the clevis hanger together is positioned so that access to it can be gained through the hole 23.

The clevis hanger 26 is supported through hole 28 by a threaded support rod 31 that is fixed to the ceiling 32 by known means. Support rod 31 and clevis hanger 26 are braced against motion in the longitudinal direction of pipe 30 by the use of the lateral brace generally designated 35 which is connected through angle iron 36 between brace elements 37 and 38, element 37 being connected to hanger 26 and element 37 which is connected to the ceiling of the structure through fastening means 40. This diagonal bracing arrangement prevents the support system consisting of the clevis hanger and the threaded rod 31 from swaying with respect to the structure caused by any force that is exerted in the plane in which the long axis of pipe 30 lies. Another lateral bracing arrangement 45 is illustrated best in FIG. 3 and it, too, comprises an angle iron 46 connected between two connecting braces 41 and 42, the connecting brace 41 being connected to the ceiling of a structure from which the hanger is hanging and the brace 42 being connected to the clevis hanger 26.

Although the braces 35 and 45 will prevent the hanger and pipe support from swaying with respect to the building in the event of an earthquake or other lateral force, they will not prevent pipe 30 from sliding longitudinally within hanger 26. However, the device of this invention firmly connects pipe 30 to flange 11 and furthermore firmly connects hanger 26 to flange 20 so that there can be no relative motion between the brace 10 and the hanger assembly which in turn prevents relative motion between pipe 30 and the structure 32.

Although the device of this invention has been illustrated with a clevis hanger it is evident that it would be adaptable to other types of hangers such as J-hangers, trapeze hangers or the like. It is also evident that means for firmly connecting an elongated load in the device of this invention could be used other than a U-bolt and that the device of this invention may be used for supporting elongated loads other than pipes, for example, electric cables or fiber-optic bundles.

I claim:

1. An apparatus to prevent relative axial motion between a support braced to a structure against motion relative to said structure, and an elongated load having an elongated axial direction and a transverse direction comprising:
   a brace including first means to releasably connect said brace against motion relative to said elongated load, said brace further including second means interlocking with said support to prevent relative motion between said support and said brace,
   wherein said first means includes a first flange, said second means includes a second flange integral with said first flange, the plane of said first flange extending perpendicular to the plane of said second flange.

2. The device of claim 1 wherein said first means includes a U-bolt extending through openings in said first flange.

3. The device of claim 1 wherein said second means includes a U-bolt extension from said second flange dimensioned to closely embrace said hanger.

* * * * *

UNITED STATES PATENT AND TRADEMARK OFFICE
CERTIFICATE OF CORRECTION

PATENT NO.  : 5,295,646
DATED       : March 22, 1994
INVENTOR(S) : Steven A. Roth It is certified that error appears in the above-identified patent and that said Letters Patent is hereby corrected as shown below:

Column 2, line 41, "support" should be --supporting--
Column 4, line 49, "U-bolt" should be --U-shaped--

Signed and Sealed this

Eleventh Day of October, 1994

Attest:

BRUCE LEHMAN

*Attesting Officer*       *Commissioner of Patents and Trademarks*